US009420433B2

(12) United States Patent
Kim et al.

(10) Patent No.: US 9,420,433 B2
(45) Date of Patent: Aug. 16, 2016

(54) METHOD AND APPARATUS FOR RECEIVING DATA IN USER EQUIPMENT OF SUPPORTING MULTIMEDIA BROADCAST MULTICAST SERVICE

(75) Inventors: Sangbum Kim, Seoul (KR); Soenghun Kim, Yongin-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 13/443,174

(22) Filed: Apr. 10, 2012

(65) Prior Publication Data

US 2012/0257562 A1    Oct. 11, 2012

Related U.S. Application Data

(60) Provisional application No. 61/473,966, filed on Apr. 11, 2011, provisional application No. 61/481,878, filed on May 3, 2011.

(30) Foreign Application Priority Data

Apr. 6, 2012  (KR) .................. 10-2012-0036220

(51) Int. Cl.
*H04W 4/00* (2009.01)
*H04W 4/06* (2009.01)
(Continued)

(52) U.S. Cl.
CPC .............. *H04W 4/06* (2013.01); *H04W 72/005* (2013.01); *H04W 72/042* (2013.01)

(58) Field of Classification Search
CPC .... H04W 72/005; H04W 8/26; H04L 12/185; H04L 12/189

USPC .................................................. 370/312, 432
See application file for complete search history.

(56) References Cited

U.S. PATENT DOCUMENTS

2011/0081854 A1    4/2011  Kuo et al.
2011/0103286 A1*   5/2011  Montojo et al. .............. 370/312
(Continued)

FOREIGN PATENT DOCUMENTS

| CN | 101998244 A | 3/2011 |
| CN | 101998246 A | 3/2011 |

(Continued)

OTHER PUBLICATIONS

ETSI TS 136 213 V10.5.0 (Mar. 2012), LTE; Evolved Universal Terrestrial Radio Access (E-UTRA); Physical layer procedures (3GPP TS 36.213 version 10.5.0 Release 10), Mar. 13, 2012.*

(Continued)

*Primary Examiner* — Frank Duong
(74) *Attorney, Agent, or Firm* — Jefferson IP Law, LLP

(57) ABSTRACT

A method and an apparatus for receiving data in a User Equipment (UE) supporting a Multimedia Broadcast Multicast Service (MBMS) are provided. A method of receiving data by a UE which supports an MBMS includes obtaining first indication information indicating a Multicast/Broadcast over a Single Frequency Network (MBSFN) subframe reserved for an MBSFN, obtaining second indication information indicating a subframe in the MBSFN subframe, the subframe decoding a Physical Multicast CHannel (PMCH), and when although a first subframe is indicated as the MBSFN subframe, the first subframe is not indicated to decode a PMCH and is not of a subframe for a Positioning Reference Signal (PRS), receiving a Physical Downlink Control CHannel (PDCCH) of the first subframe and decoding a corresponding Physical Downlink Shared CHannel (PDSCH).

18 Claims, 8 Drawing Sheets

(51) Int. Cl.
   *H04W 72/00*   (2009.01)
   *H04W 72/04*   (2009.01)

(56) References Cited

U.S. PATENT DOCUMENTS

| | | | |
|---|---|---|---|
| 2011/0222457 A1 | 9/2011 | Lee et al. | |
| 2011/0243056 A1* | 10/2011 | Jen | 370/312 |
| 2011/0274025 A1* | 11/2011 | Hsu | 370/312 |
| 2012/0113886 A1 | 5/2012 | Zhang et al. | |
| 2012/0236776 A1* | 9/2012 | Zhang et al. | 370/312 |
| 2013/0329711 A1* | 12/2013 | Seo et al. | 370/336 |

FOREIGN PATENT DOCUMENTS

| | | |
|---|---|---|
| KR | 10-2010-0071665 A | 6/2010 |
| KR | 10-2010-0103381 A | 9/2010 |

OTHER PUBLICATIONS

ETSI TS 136 213 V10.1.0 (Mar. 2011), LTE; Evolved Universal Terrestrial Radio Access (E-UTRA); Physical layer procedures (3GPP TS 36.213 version 10.1.0 Release 10), Mar. 13, 2011.*

Nokia et al: "Remaining details of transmission mode 9 control signaling", XP050489651; Nov. 9, 2010.

LG Electronics: "Remaining Details on Transmission Mode 9", R1-106322, XP050489820; Nov. 10, 2010.

LG Electronics: "Remaining Details on Transmission Mode 9", R1-106322, XP050468239; Nov. 10, 2010.

3GPP: "3rd Generation Partnership Project; Technical Specification Group Radio Access Network; Evolved Universal Terrestrial Radio Access (E-UTRA); Physical layer procedures (Release 10)", XP050487473; Mar. 24, 2011.

Samsung; Physical layer issues on PDSCH transmissions in MBSFN subframes; 3GPP TSG RAN WG1 #58bis; R1-094076; Oct. 12-16, 2009; Miyazaki, Japan.

Huawei; E-UTRAN TDD Intra Frequency RSTD Measurement Accuracy test case; 3GPP TSG-RAN WG4 Meeting #56; R4-103143; Aug. 23-27, 2010; Madrid.

Huawei; E-UTRA TDD intra-frequency RSTD measurement accuracy reporting delay with DRY test case; 3GPP TSG-RAN WG4 Meeting #57; R4-104572; Nov. 15-19, 2010; Jacksonville, FL.

Huawei et al.; PSDCH and CSI-RS transmissions in MBSEN subframes in Rel-10; 3GPP TSG RAN WG1 meeting #63bis; R1-110417; Jan. 17-21, 2011; Dublin, Ireland.

Huawei et al.; PSDCH and CSI-RS transmissions in MBSFN subframes in Rel-10; 3GPP TSG RAN WG1 meeting #64; R1-110624; Feb. 21-25, 2011; Taipei.

Huawei et al.; E-UTRAN FDD Inter Frequency RSTD Measurement Accuracy test case; 3GPP TSG-RAN WG4 Meeting #58 AH; R4-112048; Apr. 11-15, 2011; Shanghai.

Panasonic; Clarification of priority between PMCH and PDSCH reception; 3GPP TSG-RAN Meeting #65; R1-111582; May 9-13, 2011; Barcelona, Spain.

* cited by examiner

METHOD AND APPARATUS FOR RECEIVING DATA IN USER EQUIPMENT OF SUPPORTING MULTIMEDIA BROADCAST MULTICAST SERVICE

PRIORITY

This application claims the benefit under 35 U.S.C. §119 (a) of a Korean patent application filed in the Korean Intellectual Property Office on Apr. 6, 2012 and assigned Serial No. 10-2012-0036220, and the benefit under 35 U.S.C. §119 (e) of a U.S. provisional patent application filed on Apr. 11, 2011 in the United States Patent and Trademark Office and assigned Ser. No. 61/473,966, and of a U.S. provisional patent application filed on May 3, 2011 in the United States Patent and Trademark Office and assigned Ser. No. 61/481,878, the entire disclosure of each of which is hereby incorporated by reference.

BACKGROUND OF THE INVENTION

1. Field of the Invention

The present invention relates to a method and an apparatus for a communication system. More particularly, the present invention relates to a method and apparatus for receiving data by a User Equipment (UE) that supports a Multimedia Broadcast Multicast Service (MBMS).

2. Description of the Related Art

Generally, mobile communication systems have been developed for providing communication while ensuring user mobility. With continuing technological advances, a mobile communication system is now able to provide a high-speed data communication service as well as a voice communication.

Recently, the Long Term Evolution (LTE) system, which is a next generation mobile communication system, has been standardized by the 3rd Generation Partnership Project (3GPP). In implementation, an LTE system provides high-speed packet-based communication having a maximum transmission rate of about 100 Mbps. To support this transmission rate, the LTE system includes various schemes such as, a scheme of reducing the nodes located on communication paths by making a network structure simple, a scheme of allowing a wireless protocol to be as close as possible to a wireless channel etc.

Unlike a voice service, in a data service, resources and the like, which are assigned according to the quantity of data and a channel state, are determined. Thus, in a wireless communication system such as a mobile communication system, management of assigning transmission resources considering the quantity of resources available for transmission, a channel state, the quantity of data, and the like is performed by a scheduler. This is equally performed in an LTE system. Thus, a scheduler located at a base station manages and assigns wireless transmission resources.

Recently, there has been discussion regarding an evolved LTE communication system that is referred to as LTE-Advanced (LTE-A), which increases a transmission rate by applying several new technologies to the LTE system. The evolved LTE-A system includes improvement of a Multimedia Broadcast Multicast Service (MBMS). The MBMS is a broadcasting service provided through the LTE system.

FIG. 1 is a view illustrating a configuration of an MBMS network according to the related art.

Referring to FIG. 1, an MBMS service area 100 is a network area that consists of a plurality of base stations that perform Multicast/Broadcast over Single Frequency Network (MBSFN) transmission. An MBSFN area 105 is a network area that consists of several cells combined. All transmissions of cells in the MBSFN area 105 are synchronized. Except for an MBSFN area reserved cell 110, all cells are used for MBSFN transmission. As the MBSFN area reserved cell 110 is not used for the MBSFN transmission, the MBSFN area reserved cell 110 may transmit data for another object. However, even when the MBSFN area reserved cell 110 transmits data for another object, a limited transmission power may only be permitted to a wireless resource assigned to the MBSFN transmission.

SUMMARY OF THE INVENTION

Aspects of the present invention are to address the above-mentioned problems and/or disadvantages and to provide at least the advantages described below. Accordingly, an aspect of the present invention is to provide a method of receiving data which that allows a user equipment supporting a Multimedia Broadcast Multicast Service (MBMS) to effectively receive data.

In accordance with an aspect of the present invention, a method of receiving data by User Equipment (UE) which supports an MBMS includes obtaining first indication information indicating a Multicast/Broadcast over a Single Frequency Network (MBSFN) subframe reserved for an MBSFN, obtaining second indication information of indicating a subframe in the MBSFN subframe, the subframe decoding a Physical Multicast CHannel (PMCH), and, when although a first subframe is indicated as the MBSFN subframe, the first subframe is not indicated to decode a PMCH and is not of a subframe for a Positioning Reference Signal (PRS), receiving a Physical Downlink Control Channel (PDCCH) of the first subframe and decoding a corresponding PDSCH.

In accordance with another aspect of the present invention, a UE for supporting an MBMS includes a transceiver for obtaining first indication information of indicating an MBSFN subframe reserved for a MBSFN and second indication information of indicating a subframe in the MBSFN subframe to be decoded, and, when although the first subframe is indicated as the MBSFN subframe, the first subframe is not indicated to decode a PMCH and is not of a subframe for a PRS, controller for receiving a PDCCH of the first subframe and decoding a corresponding PDSCH.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a scheme that prevents a user equipment that receives a Multimedia Broadcast Multicast Service (MBMS) service from double decoding/buffering for receiving a Physical Downlink Shared CHannel (PDSCH) in a Multicast/Broadcast over a Single Frequency Network (MBSFN) subframe.

Figure 1:
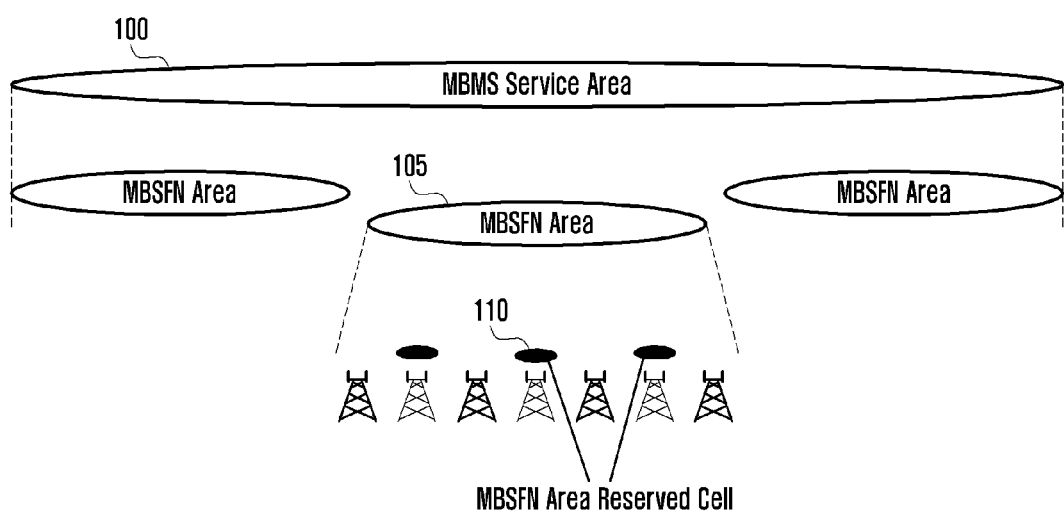
FIG. 1 is a view illustrating a configuration of a Multimedia Broadcast Multicast Service (MBMS) network according to the related art.
Figure 2:
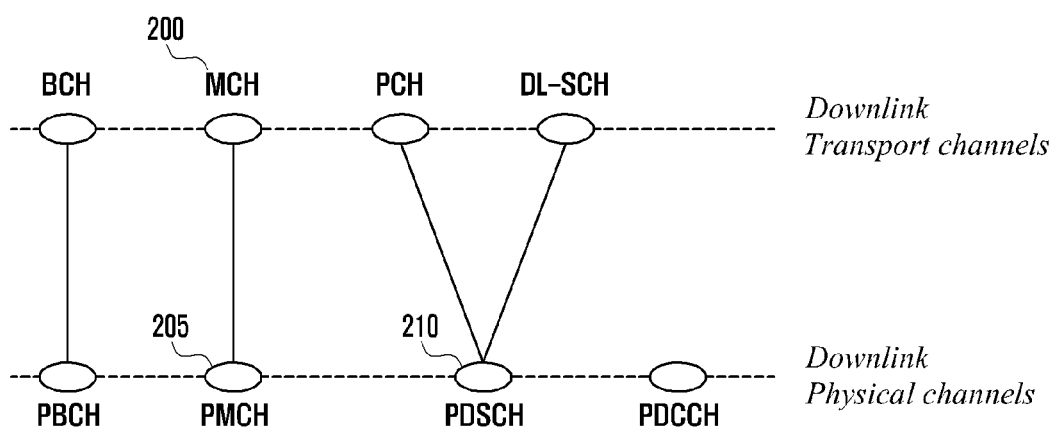
FIG. 2 is a downlink channel mapping diagram used for Multicast/Broadcast over a Single Frequency Network (MBSFN) transmission according to an exemplary embodiment of the present invention.

FIG. 2 is a downlink channel mapping diagram used for MBSFN transmission according to an exemplary embodiment of the present invention.

Referring to FIG. 2, a Multicast CHannel (MCH) 200 is used between a Media Access Control (MAC) layer and a physical layer and mapped to a Physical Multicast CHannel (PMCH) 205. A PDSCH 210 is mainly used as a unicast object.

Figure 3:
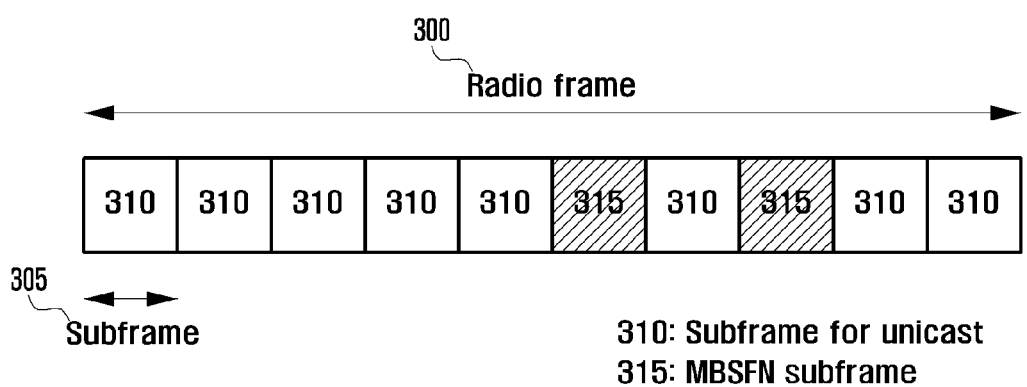
FIG. 3 a view illustrating a structure of a downlink frame used in a Long Term Evolution (LTE) system according to an exemplary embodiment of the present invention.

FIG. 3 a view illustrating a structure of a downlink frame used in a Long Term Evolution (LTE) system according to an exemplary embodiment of the present invention.

Referring to FIG. 3, a radio frame 300 includes 10 subframes 305, each of which exists as either 'a general subframe 310' used for general data transmission/reception or 'a multimedia broadcast multicast service single frequency network (referred to as 'MBSFN' hereinafter) subframe 315' used for broadcasting. There are differences between the general and MBSFN subframes in their structures and the numbers of each, such as the number of Orthogonal Frequency Division Multiplexing (OFDM) symbols, a length of a cyclic prefix, a Cell-specific Reference Signal (CRS), etc.

In the Rel-8 and Rel-9 systems, the MBSFN subframe had been used only for transmitting broadcast or multicast data. However, the system has progressed such that, after the LTE Rel-10 system, the MBSFN subframe can be not only used for the broadcast or the multicast, but also for a unicast.

In an LTE system, for effectively using a PDSCH, a multi-antenna technique and a transmission mode related to a Reference Signal (RS) are distinctively set. There are TM 1 to TM 9 in current LTE Rel-10, wherein each user equipment has one TM. TM 8 and TM 9 are newly defined in Rel-9 and Rel-10, respectively.

The TM-9 supports a Single User-Multi-Input Multi-Output (SU-MIMO) with a maximum of 8 ranks. The TM 9 supports transmission of multiple layers and in demodulation, using Rel-10 DeModulation Reference Signal (DMRS), it is possible to transmit a maximum of 8 layers. Further, although in the Rel-10 system a precoded DMRS is transmitted, there is no need to inform a receiver of a corresponding precoder index. Also, for supporting the TM 9, a Downlink Control Information (DCI) format 2C is newly defined.

The User Equipment (UE) released before the Rel-10 does not try decoding in an MBSFN subframe. Therefore, allowing all UEs to attempt decoding in the MBSFN subframe causes previously released UEs to request an upgrade. In an exemplary embodiment of the present invention, instead of allowing all UEs to receive unicast data in an MBSFN subframe, the function is only applied to UEs that need the function, for example, high-speed data communication. More particularly, the TM 9 among the above-mentioned TMs is a transmission mode in that transmission efficiency is maximized by using multiple antennas. In an exemplary embodiment of the present invention, by receiving unicast data even in an MBSFN subframe, a base station sets a UE in which it is needed to increase a data throughput into the TM 9 and allows only the UE to which the TM 9 is set to receive the unicast data in the MBSFN subframe.

In an LTE system, transmitting/receiving unicast data is informed through a Physical Downlink Control Channel (PDCCH) where the data transmission and reception are caused and actual data are transmitted through a PDSCH. Before receiving the actual data, a UE analyzes the PDCCH and determines whether there is resource assigning information assigned to the UE.

Through a more complex process, the MBSFN obtains resource assigning information. The base station informs the UE of a transmission location of a Multicast Control CHannel (MCCH) in each MBSFN provided by a cell through broadcast information of System Information Block (SIB) 13. The MCCH includes the resource assigning information for MBSFN. The UE decodes the MCCH, such that the UE recognizes the transmission location of the MBSFN subframe. The reason why the MBMS provides the resource assigning information through a scheme different from a prior unicast is because it must be possible to allow the MBMS to provide it to a UE in a standby mode. Therefore, the transmission location of control channel MCCH is transferred through the broadcast information of SIB 13.

Figure 4:
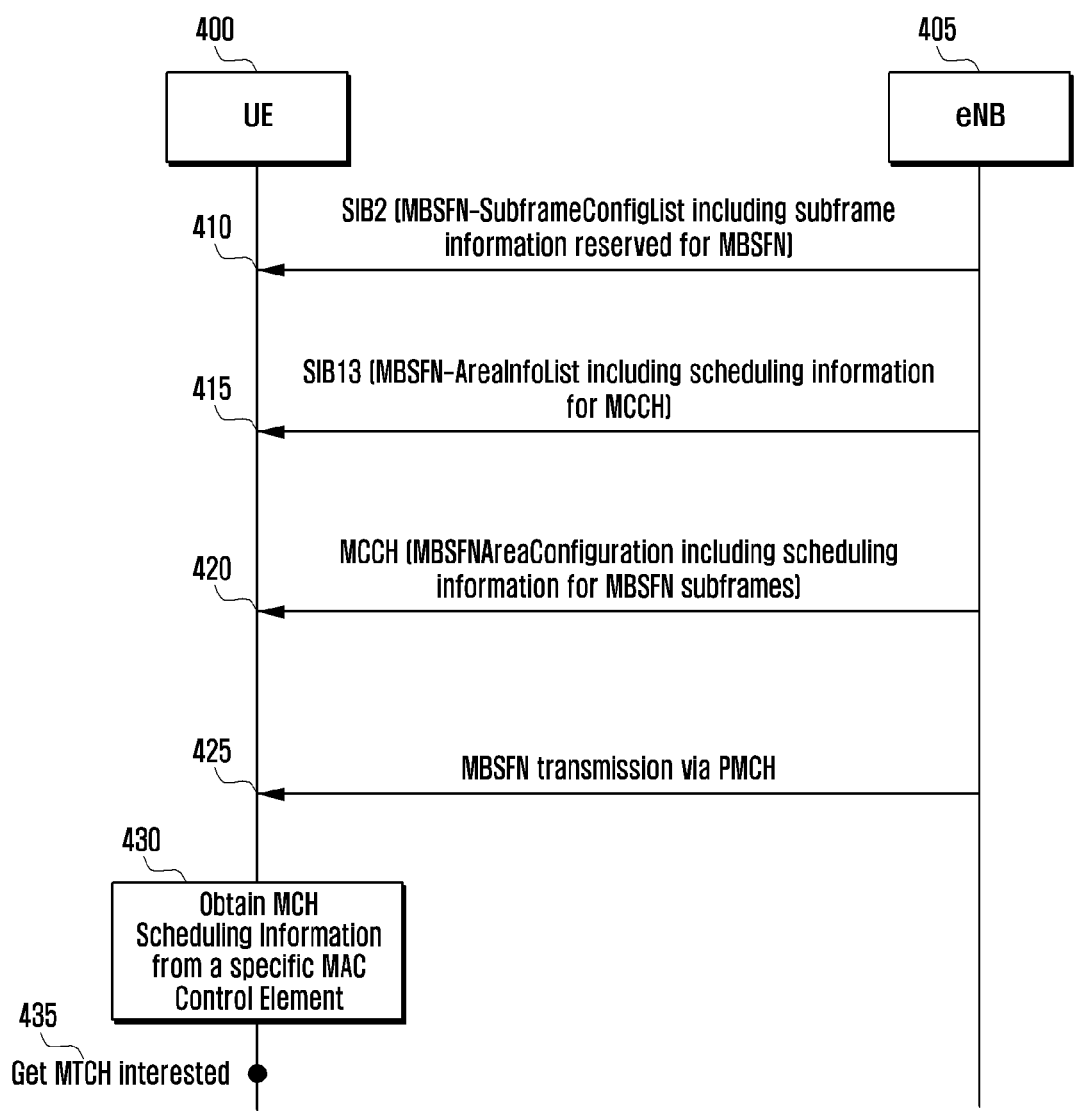
FIG. 4 is a view illustrating a procedure of receiving MBSFN by a User Equipment (UE) according to an exemplary embodiment of the present invention.

FIG. 4 is a signal diagram illustrating a procedure of receiving MBSFN by a UE.

Referring to FIG. 4, a UE 400 receives SIB2 from a base station (i.e., evolved Node B (eNB)) 405 in step 410. Information indicating subframes used for an MBSFN transmission object is included in an MBSFN-SubframeConfigList Information Element (IE) of SIB2.

An MBSFN-SubframeConfig IE is included in the MBSFN-SubframeConfigList IE, and indicates which subframe of a radio frame may become an MBSFN subframe. Table 1 contains a configuration of the MBSFN-SubframeConfig IE.

TABLE 1

```
-- ASN1START
MBSFN-SubframeConfig ::=    SEQUENCE {
    radioframeAllocationPeriod    ENUMERATED {n1, n2, n4,
n8, n16, n32},
    radioframeAllocationOffset    INTEGER (0..7),
    subframeAllocation            CHOICE {
        oneFrame                  BIT STRING (SIZE(6)),
        fourFrames                BIT STRING (SIZE(24))
    }
}
-- ASN1STOP
```

In Table 1, radioFrameAllocationPeriod and radioFrameAllocationOffset are used for supporting a radio frame including an MBSFN subframe. The radio frame has the MBSFN subframe that satisfies the following Equation 1.

$$SFN \bmod radioFrameAllocationPeriod = radioFrameAllocationOffset \quad \text{[Equation 1]}$$

In Equation 1, the SFN denotes a system frame number, and supports a radio frame number. The SFN has a range of 0 to 1023 and is repeated. The subframeAllocation indicates which subframe is an MBSFN subframe in the radio frame indicated by Equation 1. The subframeAllocation may indicate the MBSFN subframe in units of one radio frame or four radio frames. When one radio frame is used, the MBSFN subframe is indicated in oneFrame IE. The MBSFN subframe may exist in one subframe or more of 1st, 2nd, 3rd, 6th, 7th, and 8th subframes among 10 subframes. Thus, the oneFrame IE indicates the MBSFN subframe among the above-listed subframes using 6 bits. When the unit of four radio frames is used, the MBSFN subframe is indicated in a fourFrames IE. Using a total of 24 bits for covering four radio frames, the MBSFN is indicated among the above-listed subframes every frame. Therefore, the UE may exactly recognize which subframe becomes the MBSFN subframe, by using the MBSFN-SubframeConfigList IE. If the UE 400 desires MBSFN reception, the UE 400 receives the SIB13 from the base station 405 in step 415. The location information, which is transmitted through the MCCH of each MBSFN area provided by a cell, is included in the MBSFN-AreaInfoList IE of the SIB 13. The UE 400 uses the location information to receive the MCCH in step 420. Information indicating a resource location used to transmit the MBSFN is included in the MBSFNAreaConfiguration IE of the MCCH. The UE 400 uses the information to receive an MBSFN subframe in step 425. The UE 400 obtains a location of the MBSFN subframe transmitted through a Multicast Traffic CHannel (MTCH), which is desired by MCH scheduling information MAC CE and is one control element of the received MAC Packet Data Unit (PDU) in step 430. The UE 400 uses the scheduling information to decode a desired MTCH in step 435.

As described above, in LTE Rel-10, only a TM 9 UE may exclusively use a subframe assigned for MBSFN transmission for a unicast object. That is, although the subframe is reserved as an MBSFN subframe in an MBSFN-SubframeConfigList IE, the TM 9 UE may use it for the unicast object. Either a normal Cyclic Prefix (CP) or an extended CP may be applied for the subframe used for the unicast object. However, for the MBSFN subframe, only the extended CP may be applied. Thus, if the UE is not previously informed through the MBSFN-SubframeConfigList IE whether the subframes indicated through the MBSFN are for an actual MBSFN transmission object or for a unicast object, the UE must try decoding twice by applying the normal CP and the extended CP for the corresponding MBSFN subframes, respectively. After determining the object, the decoding result of applying an unsuitable CP type will be abolished. Since these dual decoding/buffering operations of the UE cause an increased system load, a method is required for effectively controlling it.

First Exemplary Embodiment

A UE obtains an MBSFN-SubframeConfigList IE through an SIB2, and determines which subframe in a corresponding cell may be used for an MBSFN subframe. A UE to which a TM 9 is set cannot use the MBSFN subframe for a unicast object. Thus, according to the presence of an MBMS service, the UE will be operated as follows:

UE to which TM 9 is not set and which does not receive an MBMS service
    Since a PDCCH for a unicast object is not received in an MBSFN subframe, a received DownLink (DL) assignment is ignored. It is operated for a UpLink (UL) grant and a Physical Hybrid Automatic Repeat reQuest (HARQ) Indicator CHannel (PHICH).

UE to which TM 9 is not set and which receives an MBMS
    The UE obtains MBMS setting (configuration) information of an MCCH and MCH scheduling information of a PMCH and identifies which MBSFN subframe an MBMS service is received through.
    The MBSFN subframe is decoded by applying an extended CP.
    Since there is not any PDSCH reception through remaining MBSFN subframes, received DL assignment is ignored. It is normally operated for a UL grant and a PHICH.

A UE to which a TM 9 is set may use an MBSFN subframe for a unicast object. Therefore, according to presence of an MBMS service, the UE will be operated as follows:

UE to which TM 9 is set and which receives an MBMS service
    The UE obtains MBMS setting information of an MCCH and MCH scheduling information of a PMCH and identifies which MBSFN subframe an MBMS service is received through.
    The MBSFN subframe is decoded by applying an extended CP.
    The UE grasps that an MBMS service is transmitted on an MBSFN subframe (remainders except for a receiving MBMS service by itself) using MCH scheduling information.
    The UE determines that a DL assignment does not exist in the MBMS service on which the MBMS service is transmitted, and ignores it even if the DL assignment is received. It is normally operated for a UL grant and a PHICH.
    By the above procedure, an MBSFN subframe through which a PMCH decoding is indicated (or an MBMS service is transmitted) or a TM-9 UE obtains a PDCCH from remaining MBSFN subframes except for a Positioning Reference Signal (PRS) subframe occasion caused by the PRS subframe setting, and decodes a PDSCH which is scheduled to a corresponding UE. At this time, until the PDCCH decoding is completed, PDSCH data are buffered in the subframes by applying a normal CP.

UE to which TM 9 is set and which does not receive an MBMS service

The UE obtains MBMS setting information of an MCCH and MCH scheduling information of a PMCH, and identifies which MBSFN subframe an MBMS service is transmitted on.

Since a DL assignment does not exist in the MBSFN subframe, the UE ignores the DL assignment even if it is received. A UL grant or a PHICH is normally operated. If the information is not received, the UE obtains a PDCCH even from the MBSFN subframes, and decodes a PDSCH which is scheduled to a corresponding UE. At this time, until the PDCCH decoding is completed, the UE buffers PDSCH data by applying a normal CP.

By the above procedure, an MBSFN subframe through which an MBMS service is transmitted or a TM-9 UE obtains a PDCCH from remaining MBSFN subframes except for a PRS subframe occasion caused by the PRS subframe setting, and decodes a PDSCH which is scheduled to a corresponding UE.

UE to which TM 9 is set and which obtains (or has) valid MBMS setting information and valid MCH scheduling information The UE performs the same operations as 'the UE to which a TM 9 is set and which does not receive an MBMS' described above.

Figure 5:
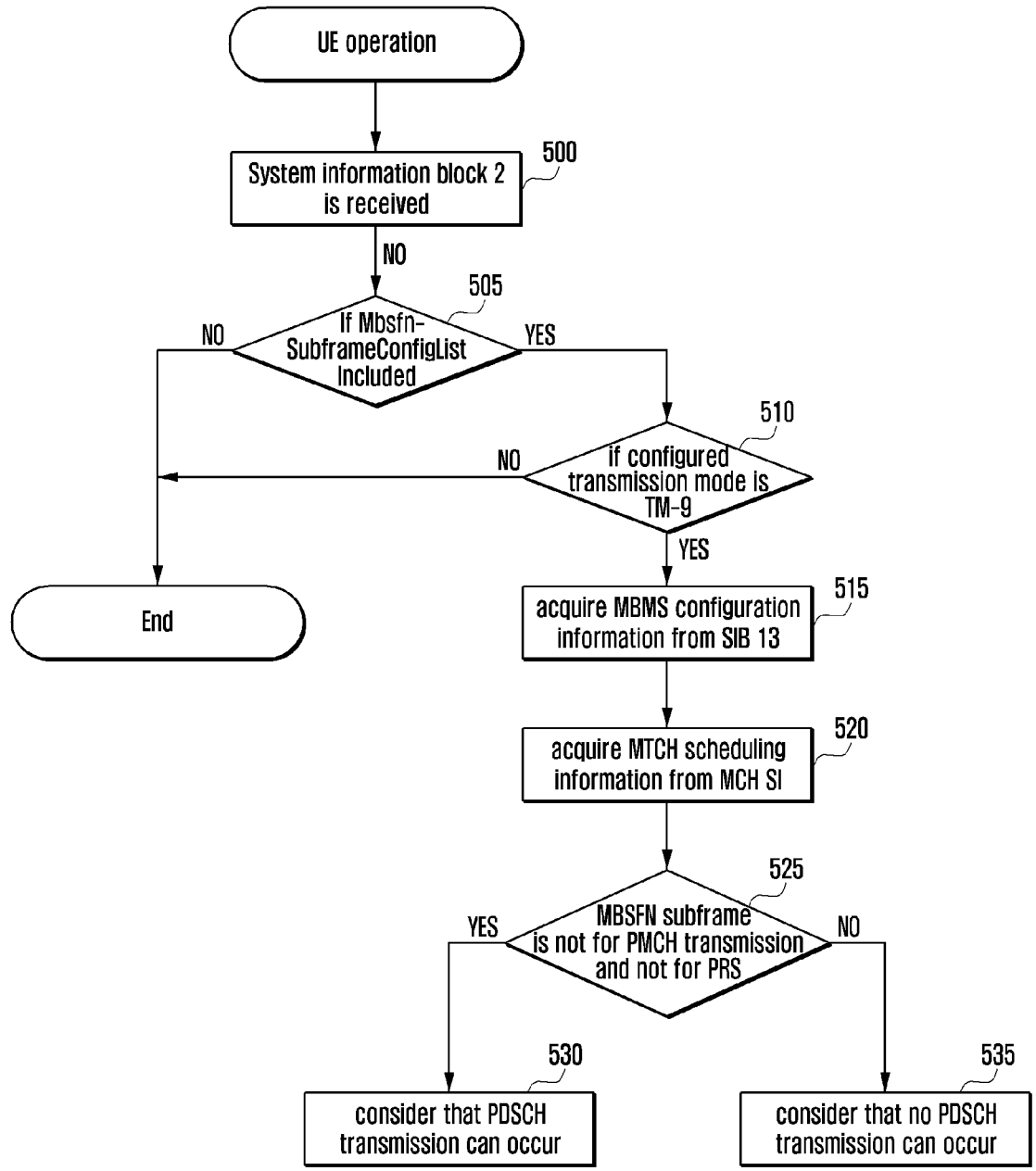
FIG. 5 is a flowchart illustrating a data receiving procedure of a UE according to a first exemplary embodiment of the present invention.

FIG. 5 is a flowchart illustrating a data receiving procedure of a UE according to the first exemplary embodiment of the present invention.

Referring to FIG. 5, a UE receives an SIB2 in step 500. The UE determines whether an MBSFN-SubframeConfigList IE is included in the SIB2 in step 505. If the MBSFN-SubframeConfigList IE is not included in the SIB2, the UE terminates a process of receiving a PDSCH at an MBSFN and operates according to the prior art. On the other hand, if the MBSFN-SubframeConfigList IE is included in the SIB2, the UE determines whether a transmission mode set for a corresponding UE is a TM 9 in step 510. If the transmission mode set for a corresponding UE is not a TM 9, the UE terminates the process of receiving a PDSCH at the MBSFN and operates according to the prior art.

On the other hand, if the transmission mode set for a corresponding UE is the TM 9, the UE receives an SIB 13 and obtains MBMS setting information (configuration information) (that is, MBSFN-AreaInfoList IE) in step 515. The MBMS setting information includes information that the UE needs for receiving an MBMS service at a corresponding cell. For example, MCCH configuration information on which MBMS control information is transmitted. The UE uses the MBMS setting information and obtains MBSFNAreaConfiguration information of an MCCH in step 520. The UE identifies a PMCH configuration of each MBSFN area from the MBSFNAreaConfiguration information, and obtains MCH Scheduling Information (SI) by receiving a PMCH. The MCH scheduling information indicates an MBSFN subframe through which an MTCH for each PMCH is transmitted. And, the UE receives an MTCH corresponding to an MBMS service which it is interested to receive. In an exemplary implementation, the TM 9 UE uses the MCH scheduling information to continuously grasp to which MBSFN subframe the MBMS service is provided, recognizes the fact that PDSCH transmission is not performed in the MBSFN subframe to which the MBMS service is provided, and does not buffer a PDSCH in the corresponding MBSFN subframe.

The UE determines whether the corresponding MBSFN subframe is an MBSFN subframe for actual PMCH transmission for each subframe. The UE performs the determination procedure using the MCH scheduling information. If the UE has not yet obtained the MCH scheduling information, the UE determines that all MBSFN subframes are not an MBSFN subframe for the PMCH transmission. That is why it is impossible to receive a PDSCH through the corresponding MBSFN frame if the UE determines that a specific MBSFN frame is used. If it is impossible to determine whether an arbitrary MBSFN subframe is for the purpose of PMCH transmission, the UE preferably regards the corresponding MBSFN subframe as for the PMCH transmission. The PMCH transmission includes MCCH transmission, MTCH transmission, and MCH scheduling information transmission. The PMCH is set with respect to each MBSFN area (such that MCH scheduling information is defined and transmitted for each MBSFN area), and the UE conventionally receives only a PMCH of an MBSFN area provided by an MBMS service that is desires. According to an exemplary embodiment of the present invention, the UE recognizes all MBSFN subframes for PMCH transmission by obtaining MCH scheduling information of all MBSFN areas which include a corresponding cell as well as an MBSFN area provided by an MBMS service which the UE itself desires to receive. As a result, the UE compresses at a minimum, the MBSFN subframes which are able to be transmitted through PDSCH transmission are compressed, and minimizes a data area buffering and minimizes false alarms of DL assignment.

The UE determines an MBSFN subframe for actual PMCH transmission, and determines whether a PRS exists in the MBSFN subframe. The PRS is a type of a reference signal which performs a positioning method used for obtaining location information of the UE. The location of the subframe for the PRS is provided from a positioning server and provides through a Non-Access-Stratum (NAS) container to the UE. The UE knows the location of the subframe for transmitting the PRS through a PRS-Info IE. The following Table 2 presents a configuration of PRS-Info IE.

TABLE 2

```
-- ASN1START
PRS-Info ::= SEQUENCE {
    prs-Bandwidth              ENUMERATED { n6, n15, n25, n50,
n100, ... },                   n75,
    prs-ConfigurationIndex     INTEGER (0..4095),
    numDL-Frames               ENUMERATED {sf-1, sf-2, sf-4, sf-6,
                                 ...},
    ...,
    prs-MutingInfo-r9 CHOICE {
        po2-r9                 BIT STRING (SIZE(2)),
        po4-r9                 BIT STRING (SIZE(4)),
        po8-r9                 BIT STRING (SIZE(8)),
        po16-r9                BIT STRING (SIZE(16)),
        ...
    }          OPTIONAL              -- Need OP
}
-- ASN1STOP
```

In Table 2, the prs-Bandwidth indicates a frequency bandwidth used for transmitting the PRS. For example, the n6 means 6 Resource Blocks (RBs), and the numDL-Frames indicates whether the PRS transmission is continuously caused in NPRS subframes. The NPRS of continuous subframes transmitting the PRS is called a positioning occasion. The PRS positioning occasion is transmitted periodically and repeatedly, and the PRS positioning occasion is moot through the prs-MutingInfo IE at a specific time point. A moot pattern has a period of units of PRS positioning occasions and has one of 2, 4, 8, and 16 periods. The UE may obtain information about which PRS positioning occasion is made moot in a bitmap type. Thus, the UE may exactly know a subframe of transferring the PRS using the PRS-Info IE.

The UE identifies whether a corresponding MBSFN subframe is for transmitting a PMCH or a PRS in step 525. If the corresponding MBSFN subframe is for transmitting the PMCH or PRS, the UE determines that it is not a PDSCH subframe for a unicast object. In this case, the process goes to step 535. Conversely, if the corresponding MBSFN subframe is not for transmitting the PMCH or PRS, the UE determines that it is a PDSCH subframe for a unicast object. In this case, the process goes to step 530.

If the MBSFN subframe is for transmitting the PMCH or PRS, the UE performs a necessary operation in step 535. If the PMCH transmission is a PMCH related to an MBMS service which the UE desires to receive, that is an MCCH or an MTCH related to an MBMS service which the UE desires to receive, or an MBSFN subframe through which MCH scheduling information is transmitted, the UE receives a data region and decodes it by applying an extended CP. If the PMCH transmission is related to a PMCH without regard to the MBMS service, the UE receives only a control region (or non-MBSFN region), but does not receive a data region (or MBSFN region).

If an MBSFN subframe is not for transmitting a PMCH (that is, a corresponding MBSFN subframe is not an MBSFN subframe which is indicated as arbitrary MTCH transmission occurs in MCH scheduling information), but determines that there is no PRS transmission, the UE determines that there is PDSCH transmission in the corresponding MBSFN subframe and performs a necessary operation in step 530. That is, the UE receives a control region, decodes a PDCCH, and buffers a data region until the PDCCH decoding is completed. At this time, a normal CP or an extended CP is applied to the data region. And, after terminating the PDCCH decoding, the UE receives a data region of the corresponding subframe and decodes the PDSCH if there is PDSCH transmission for itself in the corresponding MBSFN subframe. If there is no PDSCH transmission for itself, the UE stops receiving/buffering the data region of the corresponding subframe and deletes the buffered data region. The UE repeats the steps 523, 530 and 535 for each MBSFN subframe.

The first exemplary embodiment of the present invention will be summarized as follows: When a UE is configured in transmission mode 9, in the subframes indicated by the higher layer parameter mbsfn-SubframeConfigList except in subframes for the serving cell i) indicated by higher layers to decode PMCH or, ii) configured by higher layers to be part of a positioning reference signal occasion and the positioning reference signal occasion is only configured within MBSFN subframes and the cyclic prefix length used in subframe #0 is normal cyclic prefix, the UE shall, upon detection of a PDCCH with Cyclic Redundancy Check (CRC) scrambled by the Cell Radio Network Temporary ID (C-RNTI) with DCI format 1A or 2C intended for the UE, decode the corresponding PDSCH in the same subframe.

Second Exemplary Embodiment

The second exemplary embodiment has a very similar operation to that of the first exemplary embodiment, but has a feature of exactly indicating a PDSCH subframe for a unicast purpose in MCH scheduling information. The MCH scheduling information is provided in a type of MAC CE to a UE, and has a form as shown in FIG. 6.

Figure 6:
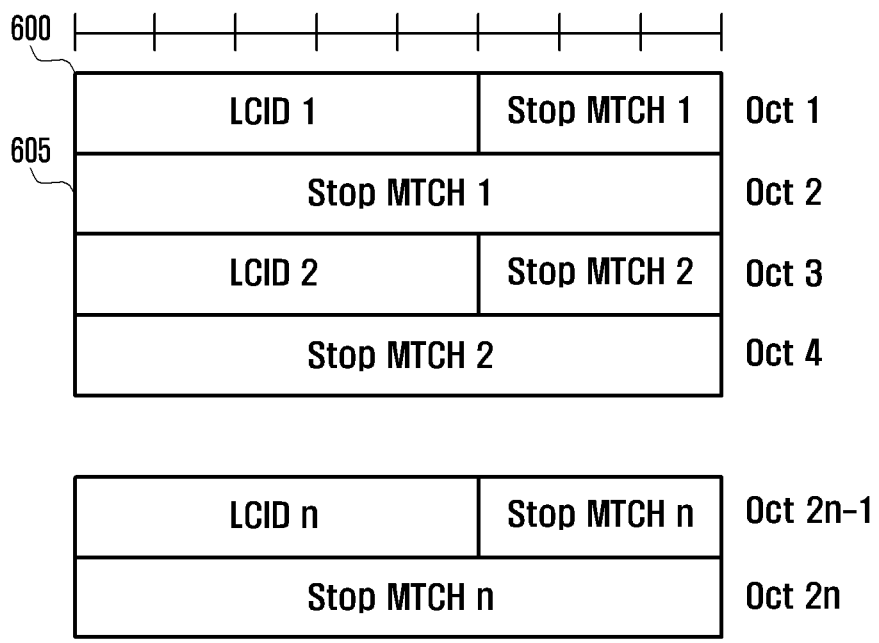
FIG. 6 is a view illustrating a configuration of scheduling information according to an exemplary embodiment of the present invention.

FIG. 6 is a view illustrating a configuration of scheduling information according to an exemplary embodiment of the present invention.

Referring to FIG. 6, an LCID 600 indicates a logical channel ID of an MTCH. A stop MTCH 605 indicates an order number of a subframe at an MCH scheduling period. The MTCH is stopped at a subframe location corresponding to the stop MTCH. A new LCID which indicates a PDSCH subframe of a unicast object is defined in the present exemplary embodiment. For example, LCID=11111 may be used for indicating a PDSCH of a unicast object.

Figure 7:
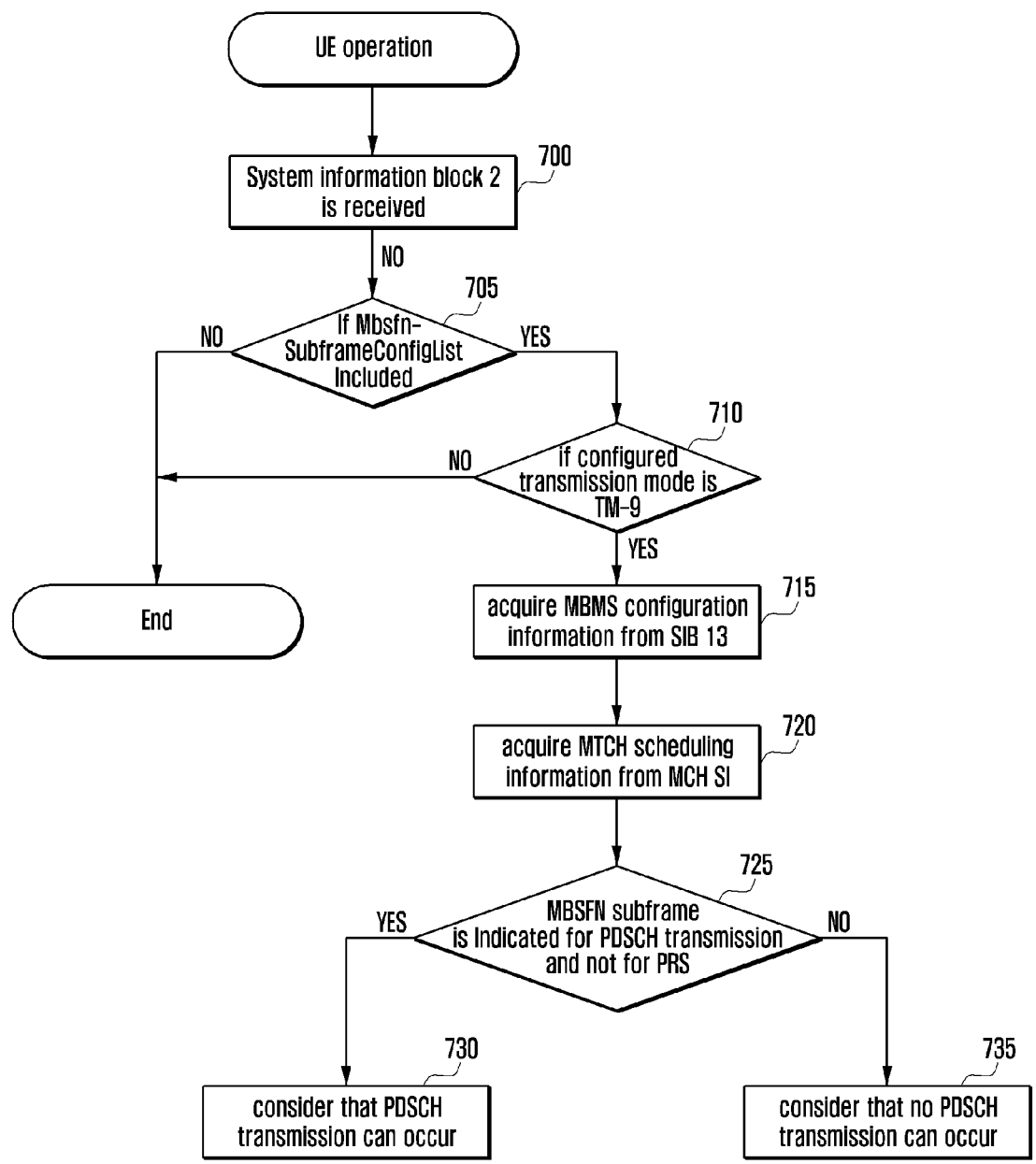
FIG. 7 is a flowchart illustrating a data receiving process of a UE according to a second exemplary embodiment of the present invention.

FIG. 7 is a flowchart illustrating a data receiving process of a UE according to the second exemplary embodiment of the present invention.

Referring to FIG. 7, since steps 700 to 715 are substantially the same as the steps 500 to 515 of the first exemplary embodiment, a detailed description thereof will be omitted hereinafter. The UE obtains MBSFNAreaConfiguration information of an MCCH using MBMS configuration information in step 720. The UE identifies a PMCH configuration of each MBSFN region in the MBSFNAreaConfiguration information, receives a PMCH, and obtains MCH scheduling information. The MCH scheduling information indicates an MBSFN subframe through which an MTCH for each PMCH is transmitted and a PDSCH subframe of a unicast object. The UE receives the MTCH corresponding to an MBMS service which it desires to receive. Further, the PDSCH scheduled for the UE in a subframe of a unicast object may be decoded. According to the present exemplary embodiment, a TM 9 UE grasps which MBSFN subframe the MBMS service is provided in, using the MCH scheduling information, and recognizes which MBSFN subframe is used for the unicast object, using the MCH scheduling information.

The UE determines whether a corresponding MBSFN subframe is for actual PMCH transmission for each MBSFN subframe using MCH scheduling information. Further, the UE determines whether the corresponding MBSFN subframe is for a unicast subframe for each MBSFN subframe using the information. If the UE does not yet obtain the MCH scheduling information, the UE determines that all MBSFN subframes are not of an MBSFN subframe for PMCH transmission.

The UE identifies not only a subframe for a unicast object, but also PRS existence in the MBSFN subframe. The PRS is used for performing a positioning method which is used to obtain location information of the UE. The locations of subframes for the PRS are provided from a positioning server, and informed through an NAS container to the UE.

The UE determines whether the MBSFN subframe is indicated as an MBSFN frame for PDSCH transmission and is not for the PRS in step 725. If the MBSFN subframe is not indicated as an MBSFN frame for PDSCH transmission or is for the PRS, the UE determines that the corresponding MBSFN subframe is not a PDSCH subframe for the unicast object. In this case, the process goes to step 735. On the contrary, if the MBSFN subframe is indicated as an MBSFN frame for PDSCH transmission or is not for the PRS, the UE determines that the corresponding MBSFN subframe is of a PDSCH subframe for the unicast object. In this case, the process goes to step 730.

If the MBSFN subframe is an MBSFN which is not indicated as for PDSCH transmission, or for the PRS, the UE performs an operation necessary for the PMCH transmission in step 735. If the PMCH transmission is a PMCH related to an MBMS service which the UE desires to receive, that is an MCCH or an MTCH related to an MBMS service which the UE desires to receive, or an MBSFN subframe through which MCH scheduling information is transmitted, the UE receives a data region and decodes it by applying an extended CP. If the PMCH transmission is related to a PMCH without regard to the MBMS service, the UE receives only a control region (or non-MBSFN region), but does not receive a data region (or MBSFN region).

If an MBSFN subframe is indicated as an MBSFN subframe and is determined that it is not for the PRS, the UE determines that the PDSCH transmission may occur in the corresponding MBSFN subframe and performs a necessary operation in step 730. That is, the UE receives a control region, decodes a PDCCH, and buffers a data region until the PDCCH decoding is completed. At this time, a normal CP or an extended CP is applied to the data region. And, after terminating the PDCCH decoding, the UE receives a data region of the corresponding subframe and decodes the PDSCH if there is PDSCH transmission for itself in the corresponding MBSFN subframe, and if there is no PDSCH transmission for itself, the UE stops receiving/buffering the data region of the corresponding subframe and deletes the buffered data region. The UE repeats the steps 752, 730 and 735 for each MBSFN subframe.

Figure 8:
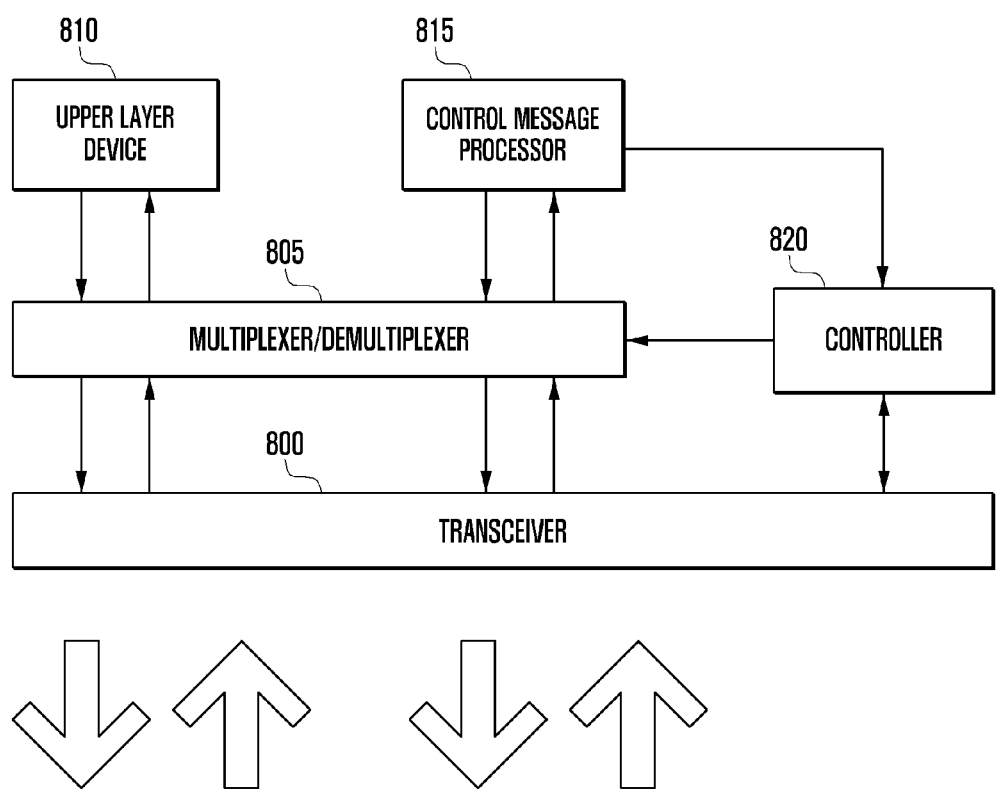
FIG. 8 is a block diagram illustrating a UE according to an exemplary embodiment of the present invention.

FIG. 8 is a block diagram illustrating a UE according to an exemplary embodiment of the present invention.

Referring to FIG. 8, the UE transmits and receives data and the like through an upper layer device 810 to and from an upper layer, and transmits and receives control messages through a control message processor 815. And, when the UE transmits a control signal or data to a base station, after multiplexing it according to a control of a controller 820, the UE transmits data through a transceiver 800. When receiving, after receiving a physical signal through the transceiver 800 according to a control of the controller 820, the UE demultiplexes a received signal through a multiplexer/demultiplexer 805 and transfers it to the upper layer or the control message processor 815 according to each of message information. More particularly, the controller 820 may perform a process for an MBSFN subframe according to a scheme of FIG. 5 or FIG. 7. Further, the transceiver 800, the control message processor 815, the upper layer device 810, and the multiplexer/demultiplexer 805 may perform operations necessary for processes of FIGS. 5 and 7.

According to an exemplary embodiment of the present invention, there is an effect that allows a UE supporting an MBMS to effectively receive data.

Since computer program instructions may be mounted in a processor of a general computer, a special computer, or other programmable data processing equipment, instructions performed through a processor of a computer or other programmable data processing equipment generates means for performing functions described in block(s) of the flowcharts. Since the computer program instructions may be stored in a computer or computer readable memory capable of orienting a computer or other programmable data processing equipment to implement functions in a specific scheme, instructions stored in the computer or computer readable memory may produce manufacturing articles involving an instruction means executing functions described in block(s) of the flowcharts. Because the computer program instructions may be mounted on a computer or other programmable data processing equipment, a series of operation steps are performed in the computer or other programmable data processing equipment to create a process executed by the computer such that instructions performed by the computer or other programmable data processing equipment may provide steps for executing functions described in block(s) of the flowcharts.

Further, each block may indicate a part of a module, a segment, or a code including at least one executable instruction for executing specific logical function(s). It should be noted that several execution examples may generate functions described in blocks out of order. For example, two continuously shown blocks may be simultaneously performed, and the blocks may be performed in a converse order according to corresponding functions.

As used herein, the term "~ unit" refers to software or a hardware structural element such as a Field Programmable Gate Array (FPGA) or an Application Specific Integrated Circuit (ASIC), and the "~ unit" perform some roles. However, the "~ unit" is not limited to software or hardware. The "~ unit" can be configured to be stored in an addressable storage medium and to play at least one processor. Accordingly, for example, the "~ unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "~ units" may be engaged by the smaller number of structural elements and "~ units", or may be divided by additional structural elements and "~ units". Furthermore, structural elements and "~ units" may be implemented to play a device or at least one CPU in a security multimedia card.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of receiving data by a User Equipment (UE) which supports a Multimedia Broadcast Multicast Service (MBMS), the method comprising:
   detecting, if the UE is in transmission mode 9, a Physical Downlink Control Channel (PDCCH) in a subframe indicated by a higher layer parameter mbsfn-SubframeConfigList; and
   decoding a Physical Downlink Shared CHannel (PDSCH) corresponding to the PDCCH in the subframe,
   wherein the subframe is not indicated by higher layers to decode Physical Multicast CHannel (PMCH), and
   wherein the subframe is not configured by higher layers to be part of a Positioning Reference Signal (PRS) occasion.

2. The method of claim 1, wherein the PRS occasion is only configured within MBSFN subframes.

3. The method of claim 1, wherein cyclic prefix length used in subframe #0 is normal cyclic prefix.

4. The method of claim 1, further comprising:
   obtaining Multicast CHannel (MCH) scheduling information; and
   if the subframe is indicated to interrupt transmission of Multicast Traffic CHannel (MTCH) by the MCH scheduling information, detecting the PDCCH in the subframe and decoding the PDSCH corresponding to the PDCCH in the subframe.

5. The method of claim 1, further comprising:
   when the subframe is indicated to decode the PMCH, receiving and decoding the PMCH of the subframe.

6. The method of claim 5, wherein when the subframe is indicated to decode the PMCH, the PDCCH of the subframe is not received.

7. The method of claim 5, wherein when the subframe is indicated to decode the PMCH, the subframe is decoded by applying an extended cyclic prefix.

8. The method of claim 7, wherein when the subframe is not indicated to decode the PMCH, the subframe is decoded by applying all of the extended cyclic prefix and a general cyclic prefix.

9. The method of claim 1, wherein Cyclic Redundancy Check (CRC) is attached to the PDCCH and the CRC is scrambled by the Cell Radio Network Temporary ID (C-RNTI) with DCI format 1A or 2C intended for the UE.

10. A User Equipment (UE) for supporting a Multimedia Broadcast Multicast Service (MBMS), the UE comprising:
   a transceiver configured to transmit and receive a signal;
   a controller configured to detect a Physical Downlink Control Channel (PDCCH) in a subframe indicated by a higher layer parameter mbsfn-SubframeConfigList if the UE is in transmission mode 9, and to decode a Physical Downlink Shared CHannel (PDSCH) corresponding to the PDCCH in the subframe,
   wherein the subframe is not indicated by higher layers to decode Physical Multicast CHannel (PMCH), and
   wherein the subframe is not configured by higher layers to be part of a Positioning Reference Signal (PRS) occasion.

11. The UE of claim 10, wherein the PRS occasion is only configured within MBSFN subframes.

12. The UE of claim 10, wherein cyclic prefix length used in subframe #0 is normal cyclic prefix.

13. The UE of claim 10, wherein the transceiver obtains Multicast CHannel (MCH) scheduling information, and
   if the subframe is indicated to interrupt transmission of Multicast Traffic CHannel (MTCH) by the MCH scheduling information, the controller detects the PDCCH in the subframe and decodes the PDSCH corresponding to the PDCCH in the subframe.

14. The UE of claim 10, wherein when the subframe is indicated to decode the PMCH, the controller receives and decodes the PMCH of the subframe.

15. The UE of claim 14, wherein when the subframe is indicated to decode the PMCH, the controller does not receive the PDCCH of the subframe.

16. The UE of claim 14, wherein when the subframe is indicated to decode the PMCH, the controller decodes the subframe by applying an extended cyclic prefix.

17. The UE of claim 16, wherein when the subframe is not indicated to decode the PMCH, the controller decodes the subframe by applying all of the extended cyclic prefix and a general cyclic prefix.

18. The UE of claim 10, wherein Cyclic Redundancy Check (CRC) is attached to the PDCCH and the CRC is scrambled by the Cell Radio Network Temporary ID (C-RNTI) with DCI format 1A or 2C intended for the UE.

* * * * *